United States Patent [19]

Hoffman

[11] Patent Number: 5,168,635
[45] Date of Patent: Dec. 8, 1992

[54] CONFORMABLE TOOL

[75] Inventor: Peter L. Hoffman, Florissant, Mo.

[73] Assignee: McDonnell Douglas Corporation, St. Louis, Mo.

[21] Appl. No.: 866,855

[22] Filed: Apr. 10, 1992

[51] Int. Cl.5 .............................................. G03B 5/20
[52] U.S. Cl. .................................................. 33/561.1
[58] Field of Search ........................ 33/561.1, 562, 529

[56] References Cited

U.S. PATENT DOCUMENTS

| | | |
|---|---|---|
| 2,487,944 | 11/1949 | Pressman . |
| 2,523,647 | 9/1950 | Burk .............................. 33/561.1 X |
| 2,621,415 | 12/1952 | Cooper et al. . |
| 2,949,674 | 8/1960 | Wexler . |
| 4,936,560 | 6/1990 | Barozzi ........................... 33/561.1 X |
| 4,956,924 | 9/1990 | Hu et al. . |

FOREIGN PATENT DOCUMENTS

| | | | |
|---|---|---|---|
| 0075642 | 2/1919 | Austria ............................ | 33/561.1 |
| 2917051 | 11/1980 | Fed. Rep. of Germany ..... | 33/561.1 |

Primary Examiner—Harry N. Haroian
Attorney, Agent, or Firm—Timothy H. Courson; Benjamin Hudson, Jr.

[57] ABSTRACT

An apparatus and method for approximating a workpiece contour. The conformable tool includes a support plate having a plurality of apertures and a two dimensional arrangement of a plurality of pins, each of which is slidably disposed within a corresponding aperture of the support plate. A plurality of locking members works in concert to simultaneously lock the plurality of pins in position once the pins have effectively approximated the contour. The conformable tool is pressed against the three dimensional contour of the workpiece so that each pin is displaced in response to the workpiece contour. The pins are then simultaneously locked in place by the locking members and the conformable tool is removed from the workpiece contour so that the conformable tool can be used as a forming base to reproduce the workpiece surface.

8 Claims, 2 Drawing Sheets

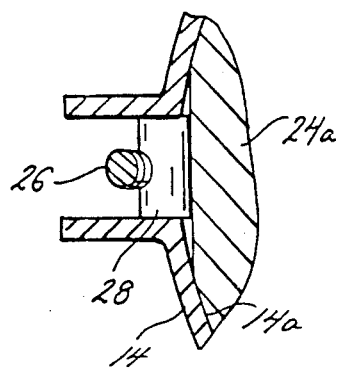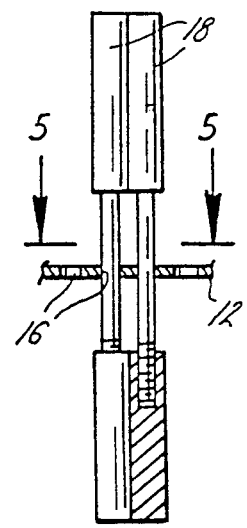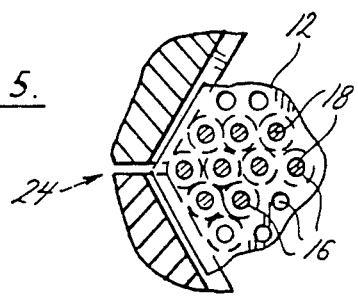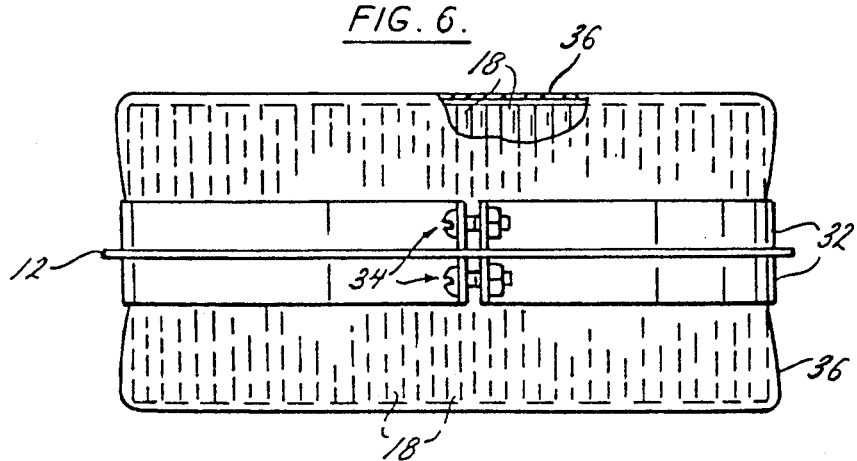

CONFORMABLE TOOL

BACKGROUND OF THE INVENTION

The present invention generally relates to a conformable tool for approximating the contour of a workpiece. Such tool can be used as a pattern or forming base for reproducing the workpiece contour on another material.

In the aircraft manufacturing industry it is important to be able to efficietnly repair the damaged exterior periphery, or moldline contour, of an airframe. Current methods of moldline transfer utilize a process which is generally referred to by those skilled in the art as a plaster splash. Using a plaster mold, the contour of an airframe area is transferred, and a repair patch is constructed therefrom, which matches the contour of the airframe. Because the original plaster splash is a negative of the moldline surface, a splash of the original plaster splash must be made before a repair patch can be constructed. This labor intensive process requires an array of supplies, all of which can be replaced by the conformable tool of the present invention. Because of the time, materials, and risk of error involved in the plaster splash process, this method can be costly and inefficient.

Devices for following the contour of a workpiece have been disclosed in U.S. Pat. Nos. 2,487,944 to Pressman; 2,621,415 to Cooper; and 2,949,674 to Wexler. Although effective in their application, these linearly arranged devices are capable only of approximating a two dimensional, single cross section of a workpiece.

U.S. Pat. No. 4,956,924 to Hu disclosed a gauge developer capable of approximating a contour and magnetically locking the approximated contour in position so that diagrams and drawings can be made therefrom. Unlike the present invention, however, the gauge developer of Hu is incapable of being locked and used as a rigid forming base for constructing a repair patch.

There is therefore a need in the art for a conformable tool which can approximate a workpiece contour in three dimensions and which can be used as a forming base for reproducing the contour on another material.

SUMMARY OF THE INVENTION

The conformable tool of the present invention includes a support plate having a plurality of apertures. The conformable tool also includes a two dimensional arrangement of a plurality of pins, each of which is slidably disposed within a corresponding aperture of the support plate. A plurality of locking members works in concert to simultaneously lock the plurality of pins in position once the pins have effectively approximated the contour, and the number of pins in the present invention is greater than the number of locking members. In the preferred embodiment, a circular housing is included as part of the conformable tool to retain the support plate.

To practice the method of the present invention, the conformable tool is pressed against the three dimensional contour of a workpiece so that each pin is displaced in relation to the support plate in response to the workpiece contour. The pins are then simultaneously locked in place by the locking members. The conformable tool is then removed from the workpiece contour so that the conformable tool can be used as a forming base to reproduce the workpiece surface.

BRIEF DESCRIPTION OF THE DRAWINGS

FIG. 3 is a sectional view taken along line 3—3 of FIG. 2;

FIG. 4 is a perspective view of the pins in the conformable tool;

FIG. 5 is a sectional view taken along line 5—5 of FIG. 4; and

FIG. 6 is a perspective view of an alternating embodiment of the present invention.

DETAILED DESCRIPTION OF THE PREFERRED EMBODIMENT

Figure 1:
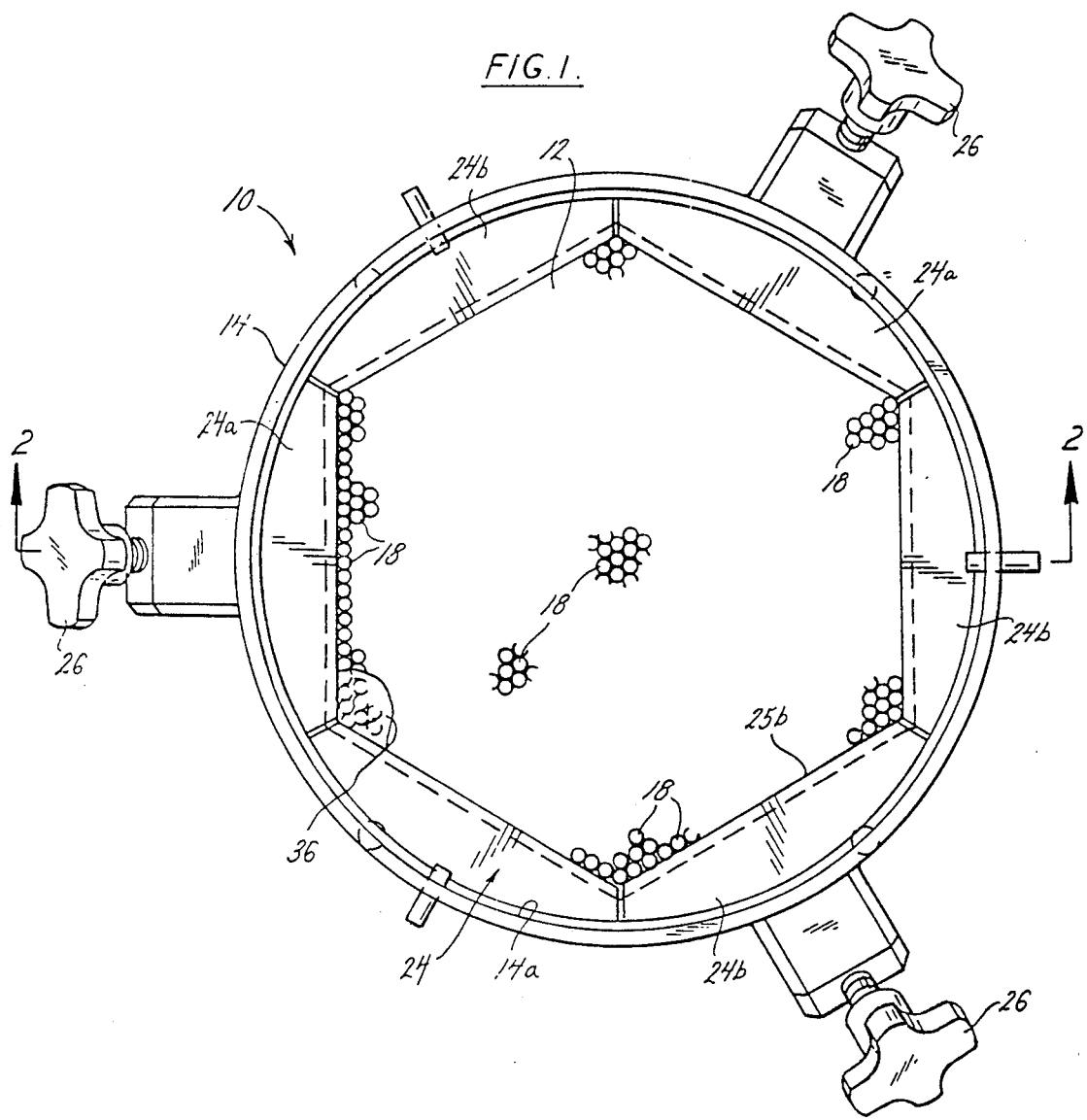
FIG. 1 is a top view of the conformable tool of the present invention.

A preferred embodiment of the present invention is shown in FIGS. 1-5. Referring to FIG. 1, conformable tool 10 includes a support plate 12 horizontally retained within a plurality of clamp wedges 24 equally spaced and disposed within an inner surface 14a of circular housing 14. Support plate 12 has a plurality of circular apertures 16 contiguously arranged in a hexagonal pattern. For each circular aperture, conformable tool 10 includes a pin 18, circular in cross section, slidably disposed therein. Note that the pins can be arranged in a two dimensional format and need not be linearly aligned as required by the prior art. As illustrated in FIG. 4, the center of each pin 18 has a diameter slightly smaller than the diameter of corresponding aperture 16 which provides independent sliding ability to pin 18 within aperture 16. Furthermore, each end of pin 18 is larger than the diameter of corresponding aperture 16 to prevent each pin 18 from becoming dislodged from support plate 12.

A plurality of locking members, preferably a plurality of clamp wedges 24, is generally comprised of an equal number moveable wedges 24a and floating wedges 24b.

Clamp wedges 24 are arranged in an alternating manner about the periphery of support plate 12 such that each moveable wedge 24a is disposed between a pair of floating wedges 24b. Each clamp wedge 24 has a first rounded side 25a to complement inner surface 14a of housing 14 and second planar side 25b to complement the sides of the hexagonal pattern of support plate 12.

Figure 2:
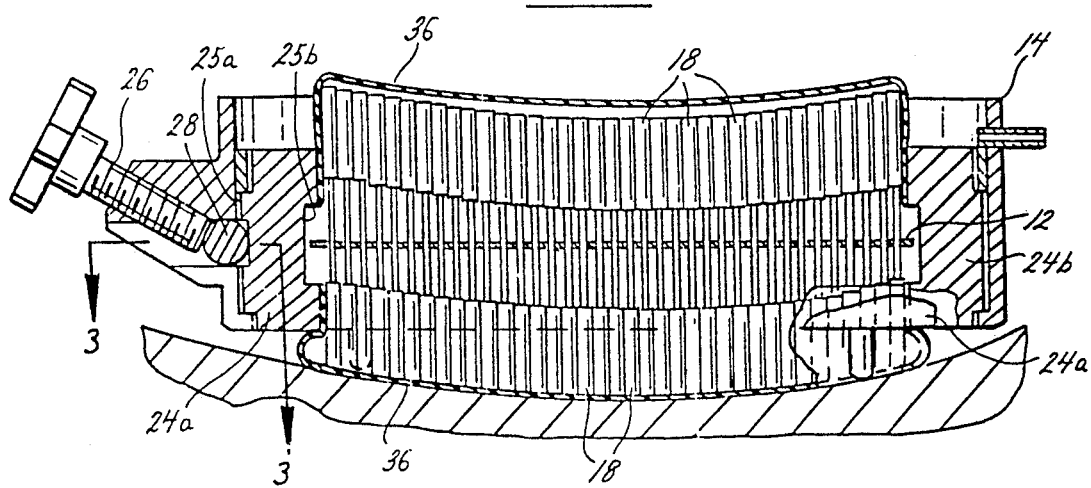
FIG. 2 is a sectional view taken along line 2—2 of FIG. 1 for more fully illustrating the novel features of the present invention.

Referring to FIGS. 1 and 2, each clamp wedge 24 includes a groove in side 25b, so that force can be applied to the plurality of pins 18 without applying force to support plate 12. Pressure is applied to each moveable wedge 24a by a securing member 26 which is threadably attached within circular housing 14. Each moveable wedge 24a is urged inward by securing member 26 to exert pressure on the plurality of pins 18 while each floating wedge 24b provides a stabilizing structure against which the plurality of pins 18 are urged. A cylindrical roller 28 is positioned between each securing member 26 and its corresponding moveable wedge 24a as shown in FIGS. 2 and 3. When engaged, securing member 26 applies pressure to its corresponding moveable wedge 24a through its associated cylindrical roller 28.

While not required for contour approximation, the plurality of pins 18 may be enclosed within a flexible sheet 36 to correct for any discontinuity in pin location in order to more closely approximate the workpiece contour.

Prior to operation, each securing member 26 is disengaged so that each pin 18 is independently slideable within support plate 12. In operation, conformable tool 10 is placed against the workpiece contour and then pressed into the workpiece so that each pin 18 is displaced relative to the contour of the workpiece. When the workpiece contour is approximated by the plurality of pins 18, the operator engages each moveable wedge 24a by threadably advancing its associated securing member 26 to apply a compacting force against the plurality of pins 18 so that the pins are locked in position. The compacting force is transferred to moveable wedge 24a by means of cylindrical roller 28 which applies the force orthogonal to the rounded first side 25a of moveable wedge 24a regardless of the orientation of securing member 26. Finally, conformable tool 10 is removed from the workpiece surface and used as a forming base for reproducing the workpiece contour.

Although the preferred embodiment employs six clamp wedges 24 arranged in a hexagonal pattern, any number of clamp wedges 24 may be employed as long as a sufficient amount of pressure is applied to the plurality of pins 18 to simultaneously lock the plurality of pins 18 in position. The movable wedges 24a and the floating wedges 24b are generally of similar construction and disposition within the circular housing 14, however, the movable wedges 24a, unlike the floating wedges 24b, are positioned adjacent securing members 26. Furthermore, the pattern of support plate 12 can be any pattern conducive to operation of conformable tool 10.

In an alternative embodiment of the present invention shown in FIG. 6, support plate 12 is circular and is disposed between a pair of adjustable bands 32 which surround the periphery of the plurality of pins 18. Note that circular housing 14 is not required for support in this alternative arrangement. Each circular band 32 is capable of being tightened around the plurality of pins 18 by a screw assembly 34, thereby providing an alternate means for locking the plurality of pins 18 in position. Adjustable bands 32 act as locking members to simultaneously lock the plurality of pins 18 in position when tightened about the periphery of the plurality of pins 18. Although not essential for contour approximation, the plurality of pins 18 may be enclosed within a flexible sheet 36 to correct any discontinuity in pin location and to ensure a smooth approximation of the workpiece surface.

Although the preferred embodiment may be used in repairing damage to airframes, it should be readily apparent to those skilled in the art that the present invention is applicable to numerous operations requiring contour approximation. Accordingly, changes and modifications in the specifically described embodiments can be carried out without departing from the scope of the invention which is intended to be limited only by the scope of the appended claims.

What is claimed is:

1. A conformable tool for approximating a workpiece contour, comprising:
   (a) a support plate having a plurality of apertures;
   (b) a plurality of pins, wherein each said pin is slidably disposed within a corresponding aperture of said support plate;
   (c) a plurality of locking members for simultaneously locking said plurality of pins in a fixed position, wherein the number of pins is greater than the number of locking members; and
   (d) means for applying compressive pressure to one or more of said locking members.

2. The conformable tool as recited in claim 1, further comprising means, surrounding said plurality of pins, for holding said support plate.

3. The conformable tool as recited in claim 2, wherein said holding means is a circular housing.

4. The conformable tool as recited in claim 1, further comprising a flexible sheet wrapped about the periphery of said plurality of pins for more closely approximating said workpiece contour.

5. The conformable tool as recited in claim 2, wherein said locking members are equally spaced and disposed within said holding means, and wherein said plurality of locking members is comprised of moveable locking members and floating locking members, and wherein said locking members are arranged in an alternating manner about the periphery of said support plate such that each moveable locking member is positioned adjacent said pressure application means and is disposed between floating locking members.

6. The conformable tool as recited in claim 1, wherein said locking members comprise a plurality of flexible bands wrapped about the periphery of said plurality of pins, wherein said support plate is flanked on each side by at least one said flexible band.

7. The conformable tool as recited in claim 1, wherein each end of each said pin is larger than the diameter of said corresponding aperture thereby preventing each said pin form dislodging from said support plate.

8. A conformable tool for approximating a workpiece contour, comprising:
   (a) a support plate having a plurality of apertures;
   (b) a plurality of pins, wherein each said pin is slidably disposed within a corresponding aperture of said support plate;
   (c) a plurality of locking members for simultaneously locking said plurality of pins in a fixed position, wherein the number of pins is greater than the number of locking members;
   (d) means for applying compressive pressure to one or more of said locking members;
   (e) means, surrounding said plurality of pins, for holding said support plate, wherein said locking members are equally spaced and disposed within said holding means, and wherein said plurality of locking members is comprised of moveable locking members and floating locking members, and wherein said locking members are arranged in an alternating manner about the periphery of said support plate such that each moveable locking member is positioned adjacent said pressure application means and is disposed between floating locking members, and wherein each end of each said pin is larger than the diameter of said corresponding aperture thereby preventing each said pin from dislodging from said support plate.

* * * * *